Patented Nov. 6, 1951

2,574,331

UNITED STATES PATENT OFFICE 2,574,331

HYDROGENATION OF UNSTABLE PETROLEUM WAX

William T. Knox, Jr., Cranford, N. J., assignor to Standard Oil Development Company, a corporation of Delaware No Drawing. Application October 29, 1947, Serial No. 782,951

3 Claims. (Cl. 196—21)

This invention relates to an improved method of stabilizing waxes. According to this invention, the heat and light stability of waxes is improved by hydrogenating under rather mild conditions, so as to avoid cracking of the waxes, using a noble metal as a catalytic material resistant to ordinary poisons and capable of regeneration.

The problem of satisfactorily refining and stabilizing waxes has long been recognized, and is particularly acute because of the use of waxes for preserving foods. The conventional process for refining crude waxes is the so-called sweating process. In this process the wax, after initial separation from petroleum oil by filtration at reduced temperatures, is held in perforated sweating pans and is exposed in solid form to a gradually rising temperature. As the temperature is increased the oily constituents of the wax tend to separate, leaving crude scale wax in the sweating pans. The crude scale wax in turn is sweated further to semi-refined wax, and this is percolated through adsorbent materials such as bone char or bauxite to improve color and odor. The product after filtration is called "refined wax." However, refined waxes obtained from certain types of crude oils, such as Panhandle and Salt Flat crudes are not rendered sufficiently stable by this treatment. As a result these waxes when exposed to elevated temperatures for a period of time will darken in color. Exposure to light over a period of time also causes discoloration. Furthermore, as a result of this inherent instability, the wax may also develop objectionable odor and taste. As it has long been appreciated that waxes refined by conventional sweating processes are not entirely satisfactory in these regards, numerous processes have been suggested to improve the quality of the wax. For example, various caustic and acid treating processes have been developed.

In a typical process of this type, the crude scale wax is acid treated and then neutralized with an aqueous caustic solution. The treated and neutralized wax is distilled in the presence of excess alkali, in the approximate amount of 0.1% by weight, and the distilled wax is sweated to refined wax in the conventional manner. Waxes produced by this method are color stable when exposed to heat or light.

The acid treating sequence as applied in the above operation may be carried out either batchwise or continuously. The crude scale wax, in a molten state, is agitated with about 15 to 40 pounds of 98% sulfuric acid or fuming sulfuric acid per 100 gallons of wax at temperatures slightly above the melting point of the wax, that is, at about 150° to 180° F. Sludge is separated out after settling and the acidic wax is neutralized with a weak solution of sodium hydroxide at 150° to 190° F. The wax is then washed with water. Yet even this process is not entirely satisfactory for producing stable waxes.

Consequently, it has been proposed to stabilize waxes by hydrogenation using a "Raney nickel catalyst" at pressures of approximately 1000 lbs. per square inch and a temperature of about 400° F. Such a catalyst is a pyrophoric form of elementary nickel. It is prepared from a nickel-aluminum alloy by dissolving the aluminum with sodium hydroxide solution and washing first with water and finally with alcohol. However, the cost of such a high pressure hydrogenation process is excessive. Furthermore, under the severe hydrogenation conditions employed, cracking of the wax tends to occur. A further difficulty of the process is that the Raney nickel catalyst is easily poisoned by sulfur compounds. This is a serious disadvantage as waxes of the type specified, that is Panhandle and Salt Flat waxes, have a relatively high content of sulfur compounds. It is apparent, therefore, that this process is not an effective procedure for stabilizing these types of waxes.

I have now found that heat and light stable waxes may be produced by hydrogenating Panhandle and Salt Flat waxes over a sulfur-resistant catalyst utilizing noble metals. The noble metals have been recognized in the art as belonging in the class of the most active hydrogenation catalysts and are effective in catalyzing hydrogenation at temperatures below 400° F. However, these catalysts in general are very sensitive to various poisons, particularly sulfur compounds. Consequently only those hydrocarbons practically free of sulfur have been treated with noble metal catalysts, so that noble metal catalysts have been of little interest industrially.

The catalytic materials as used in accordance with the present invention, however, are very resistant to the poisonous action of sulfur compounds, organic peroxides and highly unsaturated polymers. They have been used in reacting petroleum products containing these substances for over 100 hours without loss of activity. Furthermore, they may be satisfactorily regenerated by controlled burning of the carbonaceous deposits which tend to form at elevated temperatures by burning at temperatures of about 700° F. to 1100° F.

In order to prepare the catalytic material for the present process, a small amount of the platinum group noble metal, particularly selected from the class consisting of platinum and palladium, is incorporated with a carrier of the nature of alumina. Approximately 0.1 to 10% by weight of the noble metal is incorporated with the carrier. The preferred carrier, alumina, is a hydrous oxide with ultramicroscopic pores. Silica gel is a similar type of carrier and is also suitable for preparation of the catalytic material.

Two procedures may be used for incorporating the platinum group metal with the carrier. One procedure is to impregnate the carrier with a salt or acid solution of the noble metal, that is, for example, ammonium chloroplatinate or chloroplatinous acid, followed by slow drying and heat decomposition or reduction of the deposited compound. The second procedure comprises mulling of the carrier in powdered form with colloidal size particles of the noble metal, for example, platinum black, followed by extruding or pilling. The mulled mixture is extruded wet, then dried. The pilled mixture is dry when compressed into a compact form such as a pill or pellet. In practicing the present invention, the pilled or pelleted catalytic material is a preferred type.

The hydrogenation process employing the catalytic material consisting of a noble metal on an adsorbent carrier is carried out under the following conditions, according to my invention: a temperature of 300° F. to 700° F. is maintained; preferably the temperature is about 400° F. A pressure of atmosphere to 300 pounds per square inch is employed; preferably the pressure is about 50 pounds per square inch. The hydrogen feed rate is broadly 100 to 2000 cubic feet per barrel, preferably about 200 cubic feet per barrel. The wax feed rate is 0.5 to 2.0 v./v./h. (volume of wax per volume of reactor) while it is preferred that 1 v./v./h. feed rate be used.

A mixture of melted wax and hydrogen gas is fed to the hydrogenation unit. This mixture is preheated to the reaction temperature and is then passed over the catalytic material in a liquid phase operation. Unconsumed hydrogen may be recycled through the hydrogenation chamber. It is apparent that the condition and manner of hydrogenation may be greatly varied.

A particular advantage of this process is that the catalytic material disclosed is suitable for use with crude waxes containing relatively high proportions of sulfur compounds. The noble metal catalyst, prepared in the manner described, is not subject to sulfur poisoning. As the hydrogenation process may be carried out at atmospheric pressure, the apparatus and equipment required is relatively simple and inexpensive. A further advantage is the low pressure and low temperatures required for hydrogenation according to this invention, in that cracking of the wax is avoided. The effectiveness of this process in improving the stability of crude waxes is shown by the following data.

*Hydrogenation of Panhandle scale wax*

| Hyrogenating Conditions [1] | Feed Stock | Untreated Crude Scale | | Feed Stock | Acid Treated Crude Scale | |
|---|---|---|---|---|---|---|
| Temperature, °F | | 400 | 650 | | 400 | 650 |
| Hydrogenated Wax: | | | | | | |
| M. P., °F | 127 | 128 | 127 | 127 | 127 | 126 |
| Per Cent Oil (ASTM) | 3.7 | 4.6 | 4.3 | 3.7 | 4.3 | 7.0 |

SWEATING TO REFINED WAX+BAUXITE PERCOLATION

| | | | | | | |
|---|---|---|---|---|---|---|
| Yield Weight Per Cent on Charge | 26.9 | 28.0 | 28.0 | 31.2 | 26.7 | 25.3 |
| M. P., °F | 134 | 135 | 134 | 134 | 133 | 131 |
| Per Cent Oil (ASTM) | 0.1 | 0.3 | 0.3 | 0.2 | 0.2 | 0.4 |
| Color (Saybolt) | +30 | +30 | +30 | +30 | +30 | +30 |
| Heat Stab.[2] (S) | 16TR | +4 | +6 | 16TR | +9 | +12 |
| N. F. Acid Test | DNP | Pass | Pass | Pass | Pass | Pass |

[1] Atms. pressure, 1 v./v. hr., 1,500 cu. ft. H₂/Bbl. of wax.
[2] Color after 16 hours at 302° F. in presence of copper.

The yield shown is an observed yield and equals merely the weight of the refined wax product divided by the weight of the crude scale wax charged to the sweater, the quotient times 100.

Color is determined on the molten wax. The color of a column of wax, viewed longitudinally, is matched using transmitted light against a standard color. The reading is then converted into a Saybolt or Tag-Robinson number. On the Saybolt scale −17 is an amber color, +21 is water white, and +30 is the upper end of the scale. On the Tag-Robinson scale 1 is almost black, and 25 is a pale amber color equivalent to −2 Saybolt.

In determining heat stability, a sample of wax of +30 Saybolt original color is held at 302° F. for 16 hours in the presence of a small strip of burnished copper. The color of the wax is determined after the heat treatment. A wax is said to be stable if the color after 16 hours is not darker than zero Saybolt.

The N. F. (National Formulary) acid test is a test for "carbonaceous material" in which a sample of molten wax is agitated under specified conditions at 158° F. with an equal volume of concentrated sulfuric acid. The color of the acid layer is then compared visually with a standard color solution. If the acid is darker than the standard the wax does not pass; if lighter, the wax passes.

From this data it will be observed that hydrogenation of untreated crude scale wax is substantially as effective as hydrogenation of acid treated crude scale was as measured by color, heat stability, melting point, and per cent oil content. A further advantage of this process, then, is that the conventional acid treatment of a crude scale wax may be eliminated; hydrogenation alone according to the present process being sufficient to produce a satisfactory product.

My invention broadly contemplates the preparation of high quality heat and light stable wax prepared by hydrogenating crude scale wax, using a noble metal catalyst maintained on an adsorbent carrier of the nature of alumina. As brought out in the foregoing description hydrogenation, using this catalyst, may be carried out under comparatively mild conditions preventing cracking of the wax and may be carried out with sulfur containing waxes. It will be apparent to those skilled in the art, that many modifications of my invention may be made. It is, therefore, desired that the appended claims be given a broad interpretation commensurate with the contribution to the prior art.

Having now described my invention, I claim:

1. A process for hydrogenating unstable petroleum wax comprising the liquid phase hydrogenation of the wax over a catalytic material consisting of platinum incorporated with alumina having ultramicroscopic pores in which a temperature of about 400° F., a pressure of about atmospheric to 300 p. s. i., a hydrogenation feed rate of 100 to 200 cubic feet per barrel, and a wax feed rate of 0.5 to 2 v./v./hr. is employed.

2. A process for hydrogenating unstable petroleum wax comprising the liquid phase hydrogenation of the wax over a catalytic material consisting of palladium incorporated with alumina having ultramicroscopic pores in which a temperature of about 400° F., a pressure about atmospheric to 300 p. s. i., a hydrogenation feed rate of 100 to 200 cubic feet per barrel, and a wax feed rate of 0.5 to 2 v./v./hr. is employed.

3. A process for hydrogenating unstable petroleum wax comprising the liquid phase hydrogenation of the wax over a catalytic material consisting of a metal selected from the group consisting of platinum and palladium incorporated with alumina having ultramicroscopic pores in which a temperature of about 400° F., a pressure of about atmospheric to 300 p. s. i., a hydrogenation feed rate of 100 to 200 cubic feet per barrel, and a wax feed rate of 0.5 to 2 v./v./hr. is employed.

WILLIAM T. KNOX, Jr.

REFERENCES CITED

The following references are of record in the file of this patent:

UNITED STATES PATENTS

| Number | Name | Date |
| --- | --- | --- |
| 1,004,632 | Day | Oct. 3, 1911 |
| 1,124,333 | Sabatier et al. | Jan. 12, 1915 |
| 1,930,468 | Mueller-Cunradi et al. | Oct. 17, 1933 |
| 1,973,833 | Wietzel et al. | Sept. 18, 1934 |
| 2,063,623 | Pier et al. | Dec. 8, 1936 |
| 2,331,915 | Kirkpatrick | Oct. 19, 1943 |
| 2,376,086 | Reid | May 15, 1945 |
| 2,447,043 | Welty et al. | Aug. 17, 1948 |